(12) United States Patent
Park

(10) Patent No.: US 7,249,233 B2
(45) Date of Patent: Jul. 24, 2007

(54) METHOD AND APPARATUS FOR OVERWRITING DATA IN WRITE-ONCE RECORDING MEDIUM

(75) Inventor: Yong Cheol Park, Gwachon-si (KR)

(73) Assignee: LG Electronics Inc., Seoul (KR)

( * ) Notice: Subject to any disclaimer, the term of this patent is extended or adjusted under 35 U.S.C. 154(b) by 346 days.

(21) Appl. No.: 11/063,529

(22) Filed: Feb. 24, 2005

(65) Prior Publication Data

US 2005/0188152 A1 Aug. 25, 2005

Related U.S. Application Data

(60) Provisional application No. 60/547,186, filed on Feb. 25, 2004.

(30) Foreign Application Priority Data

Apr. 13, 2004 (KR) ............... 10-2004-0025320

(51) Int. Cl.
G06F 12/00 (2006.01)
(52) U.S. Cl. ..................... 711/159
(58) Field of Classification Search ................ 711/159
See application file for complete search history.

(56) References Cited

U.S. PATENT DOCUMENTS 5,210,734 A 5/1993 Sakurai 6,671,249 B2 * 12/2003 Horie ................... 369/275.3
7,027,059 B2 * 4/2006 Hux et al. .................. 345/543
2002/0099950 A1 * 7/2002 Smith ........................ 713/200
2003/0135800 A1 7/2003 Kim et al.

FOREIGN PATENT DOCUMENTS

WO WO 2004/015707 A1 2/2004

OTHER PUBLICATIONS

International search report issued Aug. 3, 2005 in corresponding International Patent Application No. PCT/KR2005/000480.

* cited by examiner

*Primary Examiner*—Gary Portka
*Assistant Examiner*—Hamdy Ahmed
(74) *Attorney, Agent, or Firm*—Harness, Dickey & Pierce, P.L.C.

(57) ABSTRACT

A method and apparatus for overwriting data in a recording medium, such as a Blu-ray disc write-once (BD-WO), are disclosed. The method includes when receiving a plurality of data record commands for a previously recorded area within the recording medium, replacement recording the received data for each record command on a non-recorded area within the recording medium, and when the plurality of record commands occur in a continuous area within the recording medium, the data is recorded on a management area within the recording medium as a management information for the plurality of record commands.

18 Claims, 9 Drawing Sheets

< TDFL >

< List of Defects >

US 7,249,233 B2

METHOD AND APPARATUS FOR OVERWRITING DATA IN WRITE-ONCE RECORDING MEDIUM

This application claims the benefit of the U.S. Provisional Application No. 60/547,186, filed on Feb. 25, 2004, and the Korean Application No. 10-2004-0025320, filed on Apr. 13, 2004, which are hereby incorporated by reference as if fully set forth herein.

BACKGROUND OF THE INVENTION

1. Field of the Invention

The present invention relates to a write-once recording medium, and more particularly, to a method and apparatus for overwriting data in a write-once recording medium.

2. Discussion of the Related Art

An innovative high density recording medium, such as a Blu-ray rewritable disc (BD-RE), for recording high quality video data and high quality audio data for a long period of time is expected to be developed and introduced to the market. Meanwhile, as shown in FIG. 1, the BD-RE has a lead-in area, a data zone and a lead-out area that are divided and allocated. The data zone has an inner spare area (hereinafter, referred to as "ISA") at its head portion and an outer spare area (hereinafter, referred to as "OSA") at its rear portion, which are divided and allocated.

The BD-RE records data in units of cluster. Herein, referring to FIG. 1, the BD-RE detects whether a defective area exists in the data zone while the BD-RE records data. When the BD-RE detects defective area in the data zone, the BD-RE performs a replacement record operation in which data recorded on the defective area is recorded on the spare area, such as an ISA, and the data recorded on the ISA is replaced for the data recorded on the defective area. Thereafter, the BD-RE records location information of the defective area and location information of the ISA as management information of a defect list in the lead-in area. Accordingly, when the defective area exists on the data zone, the BD-RE performs a replacement record operation in which data recorded on the defective area is recorded on the spare area. When reproduction is performed, the data recorded on the spare area is read and reproduced instead of the data recorded on the defective area so that data record/playback error can be prevented in advance.

Recently, the standardization of the Blu-ray disc write-once (BD-WO) has been discussed among related companies. Since a write-once recording medium can be recorded only once on its entire area, the write-once recording medium (e.g., optical disc) is not physically rewritable in contrast to a rewritable recording medium (e.g., optical disc). However, in the write-once optical disc, to edit recorded data, or to correct a corresponding portion, or for the convenience of a user or a host, overwriting operations may be necessary and an efficient method enabling data to be overwritten is needed to be developed.

SUMMARY OF THE INVENTION

Accordingly, the present invention is directed to a method and apparatus for overwriting data in a write-once recording medium that substantially obviate one or more problems due to limitations and disadvantages of the related art.

An object of the present invention is to provide an effective method for recording an entry, when consecutively overwriting data within an original recorded area of a write-once recording medium according to the present invention.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for overwriting data in a write-once recording medium includes, when receiving a plurality of data record commands for a previously recorded area within the recording medium, replacement recording the received data for each record command on a non-recorded area within the recording medium, and when the plurality of record commands is made in a continuous area within the recording medium, the data is recorded on a management area within the recording medium as a management information for the plurality of record commands.

In another aspect of the present invention, a method for overwriting data in a write-once recording medium includes, when receiving a data record command for a previously recorded area within the recording medium, replacement recording the received data for the record command on a non-recorded area within the recording medium, and recording a location information of the previously recorded area and a replacement area as at least one entry in a management area, and recording data while excluding an entry of a defect area existing within the previously recorded area.

In another aspect of the present invention, an apparatus for overwriting data in a write-once recording medium includes a memory for temporarily storing a management information in accordance with a replacement recording, and a microcomputer replacement recording the received data for each record command on a non-recorded area within the recording medium, when receiving a plurality of data record commands for a previously recorded area within the recording medium, temporarily storing the management information in accordance with the replacement recording for each record command, and controlling the management information as one entry so as to be recorded on a management area within the recording medium, when a continuity exists between the management information in accordance with the record command for each record command stored in the memory.

In another aspect of the present invention, an apparatus for overwriting data in a write-once recording medium includes a pickup unit recording data and management information on the recording medium, and a microcomputer replacement recording the received data for the record command on a non-recorded area within the recording medium, when receiving a data record command for a previously recorded area within the recording medium, recording a location information of the previously recorded area and a replacement area as at least one entry in a management area, and controlling the pickup unit so that data is recorded while excluding an entry of a defect area existing within the previously recorded area.

In a further aspect of the present invention, a recording medium includes a data area including a replacement area replacing a previously recorded area in accordance with a record command for the previously recorded area within the recording medium, and a temporary disc management area recording location information of the previously recorded area and the replacement area as two pair entries, wherein, when recording the two pair entries in the previously recorded area, the data is recorded while excluding an entry of a defect area existing within the previously recorded area.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "Blu-ray disc (BD)" will be given as an example of the recording medium proposed herein. However, it will be apparent that the spirit or scope of the present invention may be equally applied to other types of recording medium.

Figure 1:
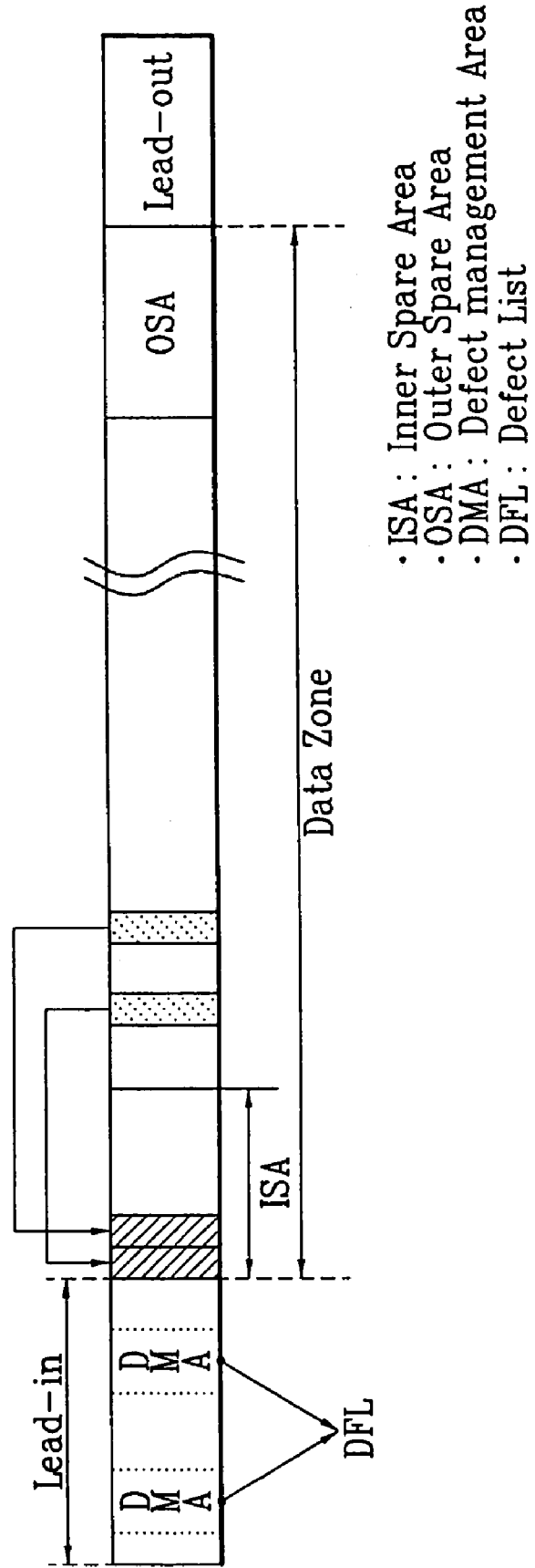
FIG. 1 illustrates a schematic diagram illustrating a structure of a general rewritable optical disc and a method for managing defects.
Figure 2:
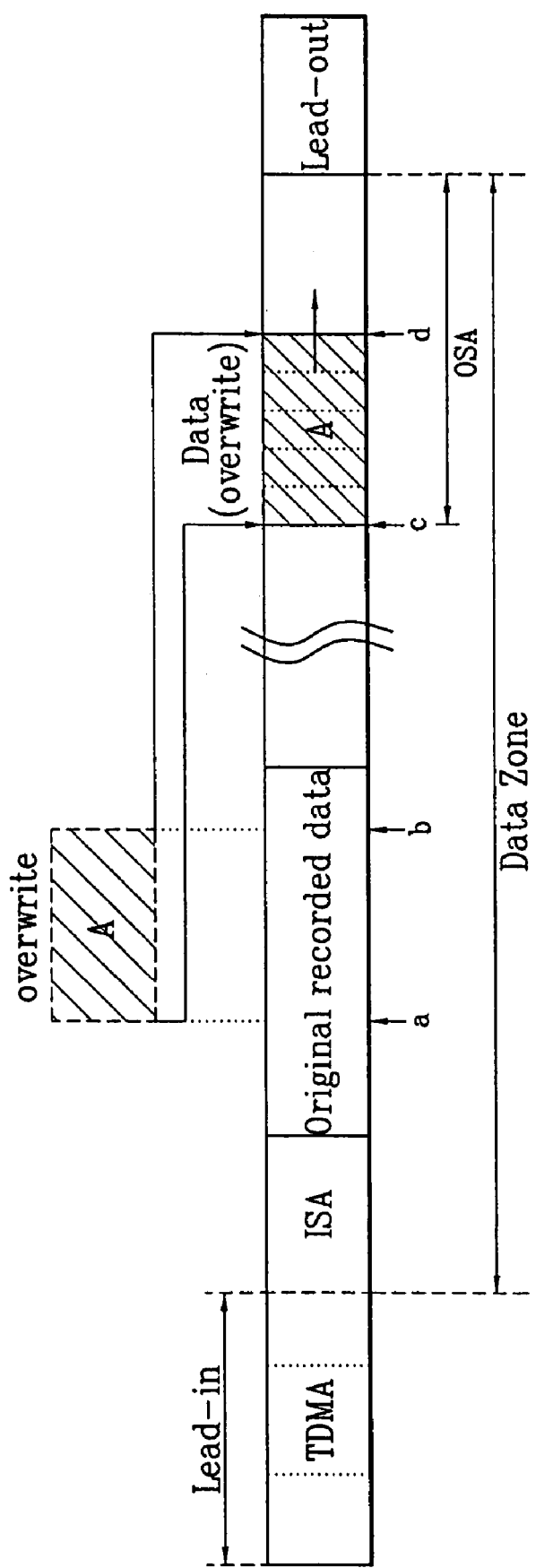
FIG. 2 illustrates an overwriting method for a write-once optical disc according to the present invention.

FIG. 2 illustrates an overwriting method for a write-once optical disc according to the present invention. As shown in FIG. 2, a write once Blu-ray disc (BD-WO) has a lead-in area, a data zone and a lead-out area that are divided and allocated. The data zone has an inner spare area (hereinafter referred to as "ISA") at its head portion and an outer spare area (hereinafter referred to as "OSA") at its rear portion, which are divided and allocated.

In a write-once optical disc having the described above structure, record management information may be updated several times while using the disc if necessary. Accordingly, the disc includes temporary disc management area (hereinafter referred to as "TDMA") in the lead-in area as an area for recording a management information of the optical disc that may be rewritten several times. A temporary defect list (hereinafter referred to as "TDFL") is recorded in the TDMA. The TDFL includes a defect list (DFL) consisting of a plurality of DFL entries on which management information, such as location information of the actual defective areas and the overwrite areas, is recorded, which will be described in detail in a later process.

In the optical disc divided and allocated as described above, if there exists any original recorded area in the data zone, the corresponding area is not allowed to be physically overwritten due to the property of the write-once optical disc. However, when a write command made by a user or host requests a drive to record data on area a-b (i.e., original recorded area), as shown in FIG. 2, the drive records the data on another area in the data zone and replaces the original data in the present invention with the newly recorded data. Accordingly, the user or the host may send a write command regardless of whether a specific area in the disc is originally recorded or not. This allows the user to use the write-once optical disc as a rewritable optical disc. And, this will be referred to as a logical overwrite (LOW) so as to be distinguished from the physical overwrite. More specifically, referring to FIG. 2, in performing the write command for the area a-b, since the area a-b is a physically completed original recorded area, the corresponding area cannot be overwritten. Alternatively, the data is recorded on area c-d, which is a spare area in the data zone, and the management information on this replacement record is recorded as the TDFL information in the TDMA of the disc, thereby executing the write command.

For the originally recorded disc, when the host wishes to reproduce the data on the area a-b at the user's request, the drive reproduces the data on the area c-d instead of the data on the area a-b with reference to the recorded management information, thereby executing a reproduction command. This method is performed identically as the method for recording, on the spare area, the data to be recorded on the defective area when consecutive defect areas are made in the disc, as shown in FIG. 3.

Figure 3:
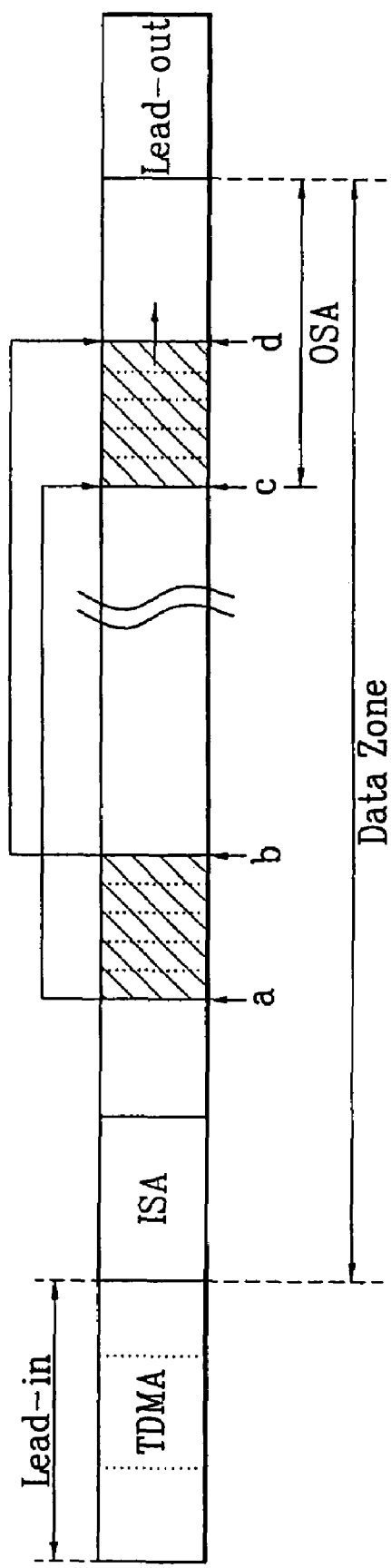
FIG. 3 illustrates a method for managing a defective area of a write-once optical disc according to the present invention.

FIG. 3 illustrates a method for managing a defective area of a write-once optical disc according to the present invention. As shown in FIG. 3, in a write-once optical disc that has a lead-in area, a data zone and a lead-out area that are divided and allocated, and wherein the data zone has an ISA at its head portion and an OSA at its rear portion, a defective area a-b may be made within a specific area in the data zone on which actual data will be recorded. Herein, the defective area may be physically made (or created) in one or more clusters. In the example shown in FIG. 3, the defective area is made in a plurality of consecutive clusters. This case may occur when, although the defective area is made on one cluster, a surrounding plurality of clusters are treated as defective areas for the instance when the surrounding plurality of clusters are damaged or contaminated due to settings of the optical disc drive. If the plurality of consecutive clusters corresponds to defective areas as described above, the data that is to be recorded on the corresponding area are recorded on the spare area (ISA or OSA). In FIG. 3, the data to be recorded on the corresponding area are recorded on the area c-d of an OSA. At this time, the data is recorded from an inner side of the spare area to the lead-out area.

As described above, if the data are recorded on the OSA, management information on the replacement recording is recorded as the TDFL information in the TDMA of the disc, thereby executing the write command. Accordingly, for the originally recorded disc, when the host wishes to reproduce the data on the area a-b at the user's request, the drive reproduces the data on the area c-d instead of the data on the area a-b referring to the recorded management information, thereby executing a reproduction command.

According to the present invention, the defect made on consecutive multiple clusters, which requires replacement record on a spare area, is specially called a consecutive re-allocatable defect (CRD). In relation to the CRD, the defect made on one cluster, which requires replacement record on a spare area, is called a re-allocatable defect (RAD). Also, the defect made on one cluster, which does not require replacement record on a spare area, is called a non-reallocatable defect (NRD).

As shown in FIGS. 2 and 3, in the viewpoint of recording data of an overwrite area on a spare area, if consecutive defect areas are made, the logical overwrite method is performed identically as the CRD type in which the data to be recorded on the defective area is recorded on a spare area. Accordingly, in the logical overwrite method, the actual recording type of the DFL entry is CRD entry type. The CRD entry type will be described in detail with reference to the accompanying drawings.

Figure 4:
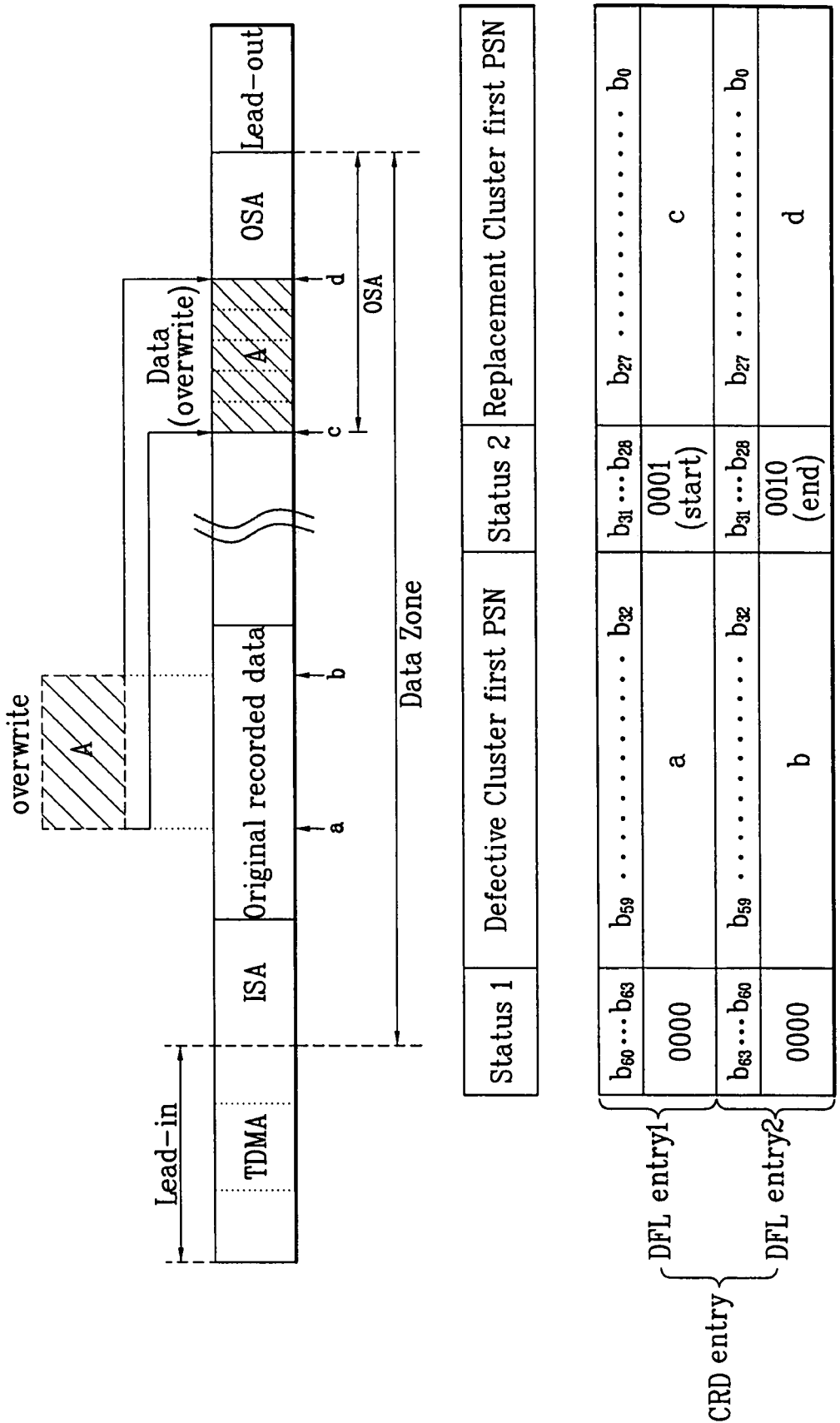
FIG. 4 illustrates a method for recording overwrite management information according to the present invention.

FIG. 4 illustrates a method for recording overwrite management information according to the present invention. Referring to FIG. 4, as described above, according to an overwrite command of the host at the user's request, if data is overwritten on the original recorded area, the data is recorded on the spare area. In this case, the necessary overwrite management information is treated as the CRD type of the consecutive defect clusters. In other words, for the CRD type of the consecutive defect clusters, the management information recorded on the TDMA can be represented by using two DFL entries.

As shown in FIG. 4, for one entry, information as to whether replacement record is performed is recorded in a "status 1" field as information on DFL entry type. For example, the information as to whether replacement record refers to the DFL entry of the RAD type or the CRD type, wherein the replacement recording for a defective area is completed normally when the information is '0000'. When the information is '0001', the information refers to the DFL entry of the NRD type, wherein no replacement area for replacement recording for a defective area is indicated. The location information of a defective cluster is recorded in a "Defective Cluster first physical sector number (PSN)" field. Herein, the location information is recorded as a first PSN of the corresponding cluster.

Information on a type and an attribute of each of the DFL entries is recorded in a "status 2" field along with the "status 1" field. For example, when the information is '0000', the information means that there is a defect area in one cluster. When the information is '0001', the information means a start of the plurality of consecutive defective clusters. And, when the information is '0010', the information means an end of the plurality of consecutive defective clusters. The location information of a spare area, on which data of a defective area is recorded, is recorded in a "Replacement Cluster first PSN" field. Herein, the location information is recorded as a first PSN of the corresponding cluster.

Also, the "status 1" field and the "status 2" field represent information on the type of each of the DFL entries using another entry. Especially, '0010' is recorded on the "status 2" field of second entry to inform the end of the plurality of consecutive defective clusters and the replacement cluster. A first PSN of an end cluster of location information on the defective clusters is recorded on a "Defective Cluster first PSN" field. A first PSN of an end cluster of location information of the replacement area of the spare area, on which data of the defective area is recorded, is recorded on a "Replacement Cluster first PSN" field. Herein, the one entry consists of eight bytes (sixty-four bits). Four bits are provided for each of the "status" fields. Twenty-eight bits are provided for each of the "Defective Cluster first PSN" field and the "Replacement Cluster first PSN" field.

The example of FIG. 4 showing the method for overwriting data using the entry format having the above structure according to the present invention will now be described. '0000' is recorded in a "status 1" field of a first entry (DFL entry 1) to represent that replacement recording is performed. A first PSN 'a' of the defective cluster is recorded on the "Defective Cluster first PSN" field. Also, '0001' is recorded in a "status 2" field of the first entry (DFL entry 1) to represent a start of the consecutive defect clusters. A first PSN 'c' of a location in the replacement area of the spare area, on which data of the defective area is recorded, is recorded on a "Replacement Cluster first PSN" field. In addition, '0000' is recorded in a "status 1" field of a second entry (DFL entry 2) to represent that the replacement recording is performed. A first PSN 'b' of an end cluster of the defective clusters is recorded on the "Defective Cluster first PSN" field. Also, '0010' is recorded in a "status 2" field of the second entry (DFL entry 2) to represent an end of the consecutive defect clusters. A first PSN 'd' of the end cluster of a location in the replacement area of the spare area, on which data of the defective area is recorded, is recorded on a "Replacement Cluster first PSN" field.

Accordingly, when the host wishes to reproduce the data on the area a-b at the user's request, the drive will reproduce the data on the area c-d referring to the information recorded on the TDMA. Meanwhile, in the method for representing management information on an overwrite using two DFL entries (DFL entry 1 and DFL entry 2), the two DFL entries are commonly named "CRD entry".

Figure 5A:
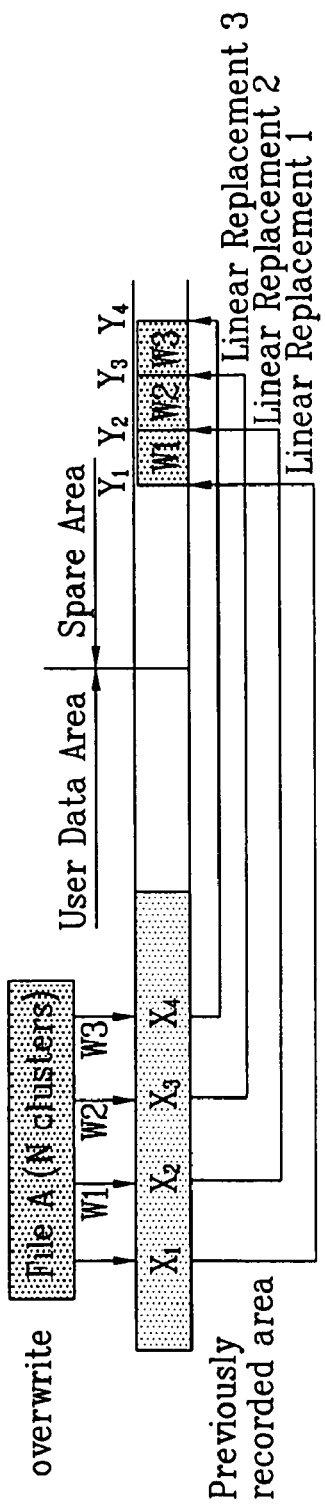
FIGS. 5A and 5B illustrate an overwriting method according to an embodiment of the present invention.
Figure 5B:
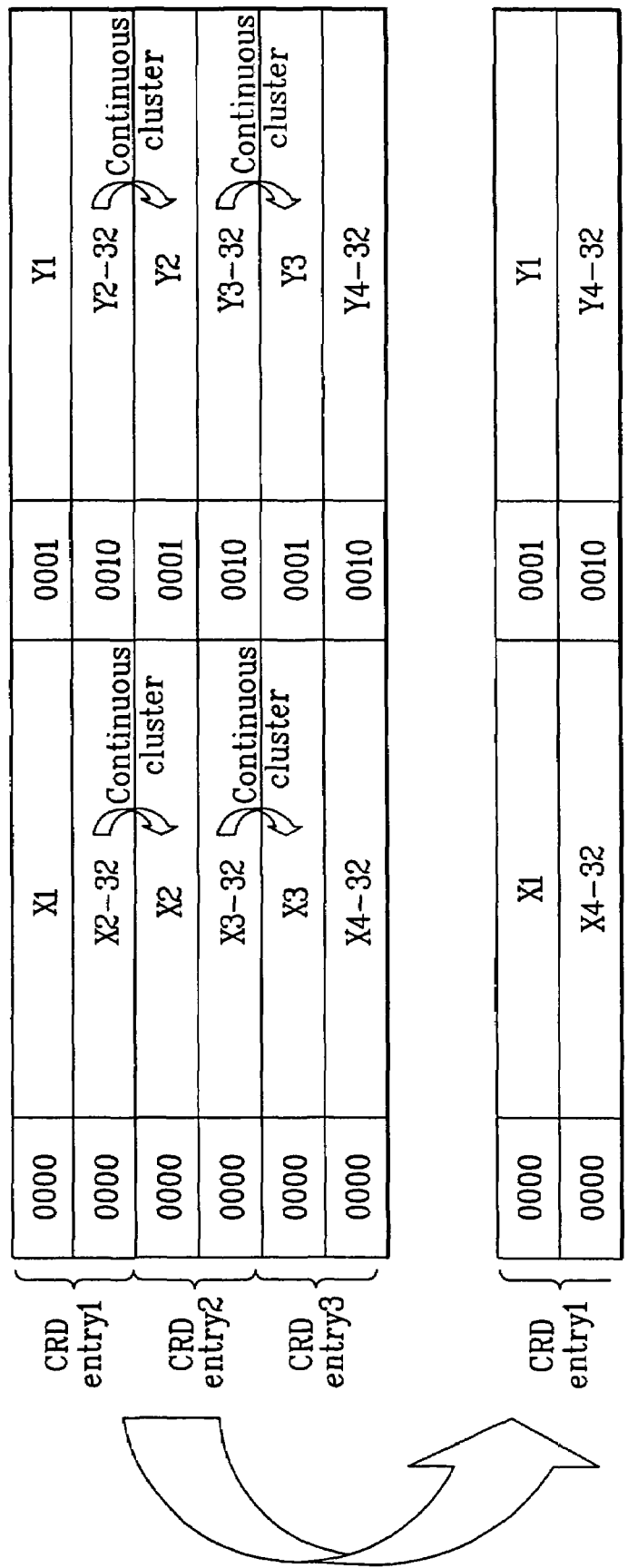

FIGS. 5A and 5B illustrate an overwriting method according to an embodiment of the present invention. FIGS. 5A and 5B illustrate a particular overwriting method according to an overwrite command of a user or a host. First, as shown in FIG. 5A, when an overwrite command for overwriting data on a previous recorded area of a write-once optical disc is transmitted to a drive at the user or host's request, the drive records, on a spare area, the data that is to be recorded on the previous recorded area. Herein, the overwrite command is transmitted including information on a location for recording data on the optical disc (start position and sector unit) (e.g., x1, x2, x3, . . . ) and data size (length and cluster unit) (e.g., m1, m2, m3, . . . ). As shown in FIG. 5A, the write commands may be transmitted continuously.

W1 command of the write commands transmitted continuously commands to record data on the disc at location x1 by cluster m1. However, since the location X1 is a previously recorded area (or original recorded area), an optical disc drive record data on the disc from location Y1 within a spare area by cluster m1. For the W1 command, as shown in FIG. 4, the drive records CRD entry 1 as management information on replacement recording of the overwrite command in a defect list of the TDFL included in the TDMA area. Herein, the CRD entry 1 is represented by two DFL entries. '0000' is recorded on the "status 1" field of the DFL entry 1. 'X1' is recorded on the "Defective Cluster first PSN" field. 'Y1' is recorded on the "status 1" field of the DFL entry 1. Also, '0000' is recorded on the "status 1" field of the DFL entry 2. 'X2-32' is recorded on the "Defective Cluster first PSN" field.

Herein, the 'X2-32' is recorded as described above because the location information is the first PSN of an end defective cluster. In other words, since one cluster consists of thirty-two sectors, a head PSN of a neighboring cluster is deviated from X2 by thirty-two sectors in the address. If one cluster consists of sixteen sectors, a head PSN of a neighboring cluster is deviated from X2 by sixteen sectors in the address. Additionally, '0010' is recorded on the "status 2" field of the DFL entry 2. 'Y2-32' is recorded on the "Replacement Cluster first PSN" field.

Similarly, for W2 command and W3 command, CRD entry 2 and CRD entry 3 are generated sectors, the drive records (or updates) the CRD entry 2 and the CRD entry 3 in a defect list of the TDFL of the TDMA area so that the optical disc has management information on the replacement area. However, if the data recorded according to the overwrite command are consecutive to each other, the method shown in FIG. 5A may be inefficient. In other words, the write-once optical disc may cause waste in the TDMA area. Therefore, according to the present invention, if the data recorded according to the overwrite command are consecutive to each other as describe above, the consecutive data is compressed into a CRD entry to record the compressed data on the optical disc, which will now be described in detail with reference to FIG. 5B.

The table shown in FIG. 5B is a CRD entry table of an embodiment according to the present invention of FIG. 5A. Referring to FIG. 5B, the CRD entry generated in accordance with to write commands W1, W2 and W3 includes information on consecutive clusters. In other words, a cluster represented by a CRD entry 1 is next to a cluster represented by a CRD entry 2, and the cluster represented by the CRD entry 2 is next to a cluster represented by a CRD entry 3.

According to the present invention, if the data recorded according to the overwrite command are consecutive, the location information on start and end clusters is represented by using a CRD entry. To achieve this, an optical disc drive buffers consecutive write commands in its embedded memory and records management information at once. In other words, replacement recording is performed according to every overwrite command, the generated CRD entry is stored not on the optical disc but in the embedded memory of the drive. The CRD entry is searched, and entries including information on consecutive clusters are reduced into one entry and recorded on the optical disc so that the TDMA area may be efficiently used.

Referring to FIG. 5B, replacement recordings are performed due to overwrite commands W1, W2 and W3, since CRD 1, CRD 2 and CRD 3 which are generated management information are consecutive to one another, the CRD entry recorded finally on the TDMA area of the optical disc represents location information on consecutive first and last clusters in the overwrite area and consecutive first and last clusters in the replacement area using two DFL entries. Accordingly, '0000' is recorded in a "status 1" field of a first DFL entry. 'X1' is recorded on the "Defective Cluster first PSN" field. '0001' is recorded in a "status 2" field of the first DFL entry. 'Y1' is recorded on a "Replacement Cluster first PSN" field. 0000' is recorded in a "status 1" field of a second DFL entry. 'X4-32' is recorded on the "Defective Cluster first PSN" field. '0010' is recorded in a "status 2" field of the second DFL entry. 'Y4-32' is recorded on a "Replacement Cluster first PSN" field.

It is apparent that an optical disc drive buffers not only management information generated by an overwrite command but also actual data in its embedded memory and records management information and the data at once if the data are consecutive. Various embodiments can be implemented according to capacity of the embedded memory.

Figure 6:
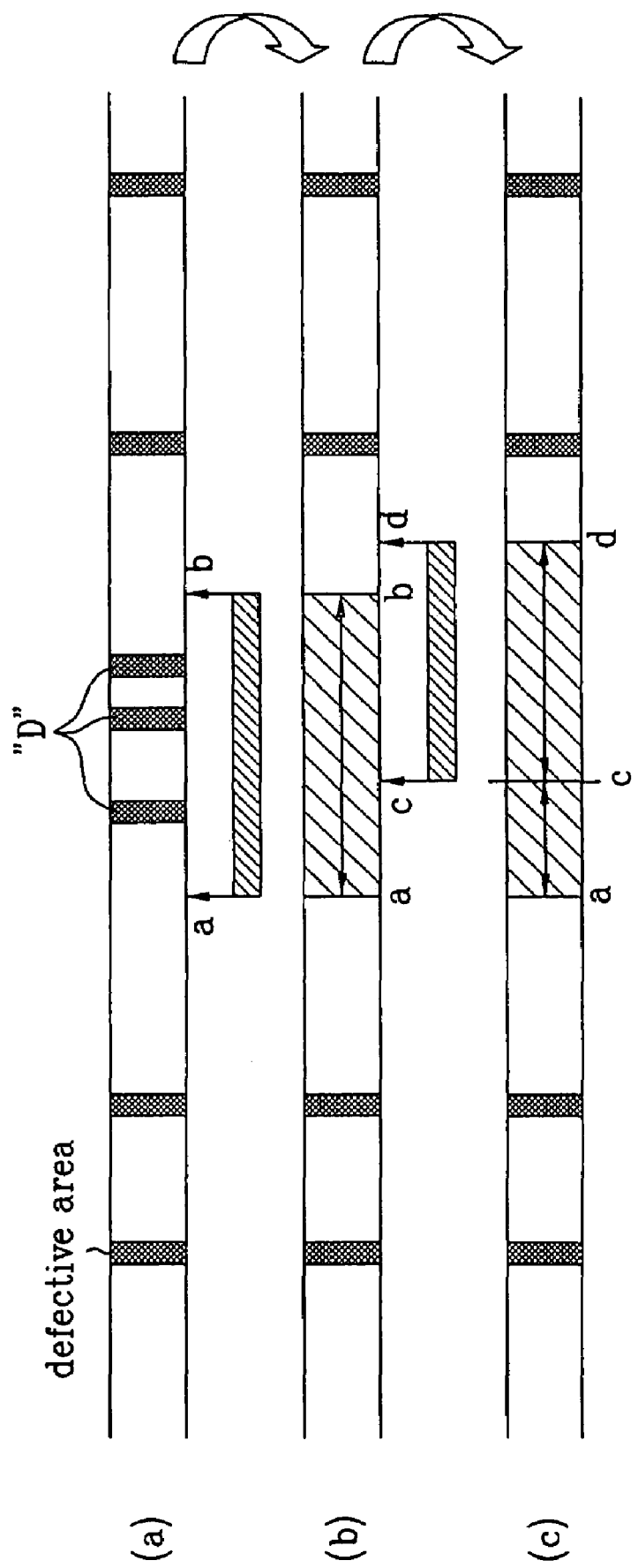
FIG. 6 illustrates various overwriting formats according to the present invention.

FIG. 6 illustrates management information based on various overwriting formats according to the present invention, such as a method for recording a CRD entry. The optical disc of (a) illustrates an original recorded area in a write-once optical disc. Referring to (a) of FIG. 6, a defect area may be included in the original recorded area of the optical disc. The management information for the defect area is recorded as one entry in the TDMA area within the optical disc, which is particularly referred to as a re-allocated defect (RAD) type. More specifically, in the RAD type entry, the defect area is formed based on one cluster. Accordingly, when overwriting is performed on the original recorded area including the defect area at a request made by the user or the host, the data to be overwritten is replacement recorded in a spare area of the optical disc regardless of the management information of the defect area and whether replacement recording has been performed.

Therefore, seven (7) defect entries for representing information (e.g., RAD type entry) on the first seven (7) defect area recorded on the TDMA area of the optical disc is recorded as six (6) defect entries including the management information of area a-b, which is the overwriting area. More specifically, since three (3) entries for each of the defect areas D originally included in area a-b are already included in area a-b, the three entries are excluded when recording the CRD type entry for managing area a-b. Most particularly, this is to ensure that the CRD type entry, which is formed of two pairs, is continuously recorded. In other words, when recording the entry in the TDMA area, the entries are sorted by a specific order (e.g., by the order of "status 1" and "Defective Cluster first PSN field" within the entries). Therefore, if the three entries for each of the defect areas D are not excluded, the CRD type entry cannot be recorded continuously.

The optical disc of (b) illustrates an example of a portion of the overwritten area (area a-b) being overwritten once again (area c-d) by using the method (a) of FIG. 6. Referring to (b) of FIG. 6, when data is overwritten once again in the area including the overwritten area (area a-b) at the request made by the user or host, the information that is to recorded in area c-d is recorded in a replacement area on the optical disc, as shown in (a) of FIG. 6. (c) of FIG. 6 illustrates a final recording formatted of the optical disc. The defect entry for managing the recording format shown in (c) of FIG. 6 includes four (4) RAD type entries, a CRD type entry for area a-c, and a CRD type entry for area c-d. Accordingly, each of the CRD type entries consists of two (2) pair entries, and so a total of eight (8) defect entries are included herein.

Figure 7:
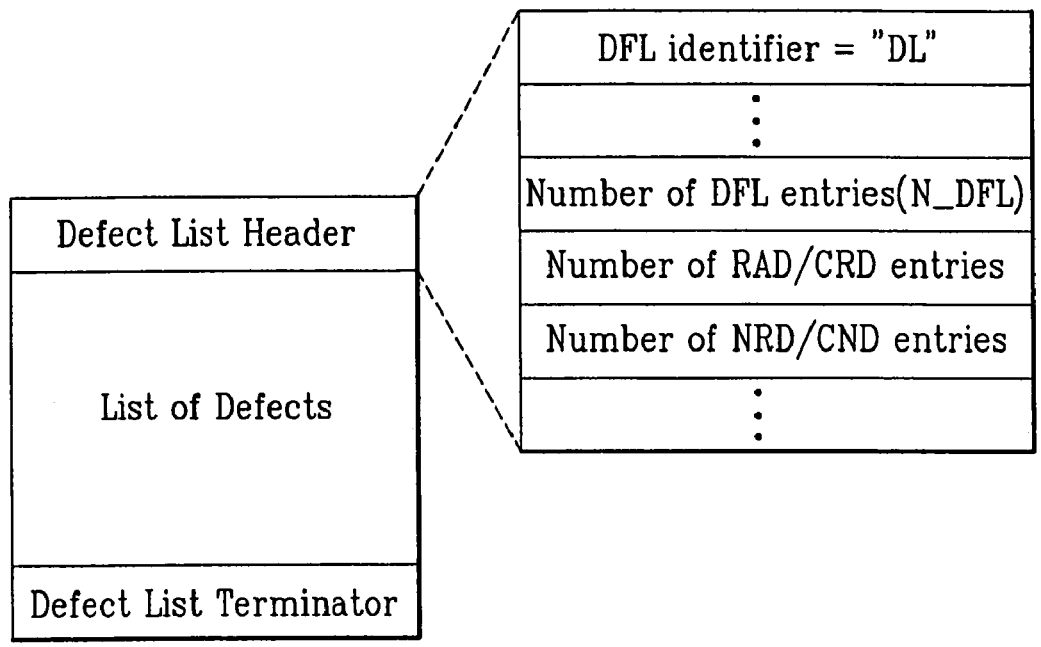
FIG. 7 illustrates a format in which overwrite management information is recorded according to the present invention.
Figure 7:
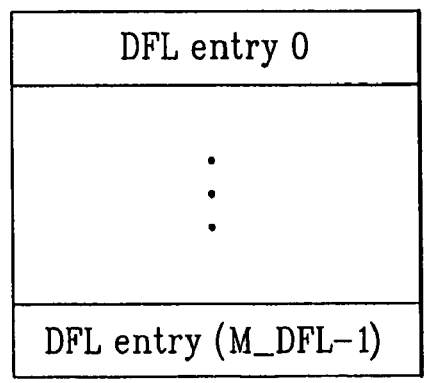

FIG. 7 illustrates a format in which overwrite management information is recorded according to the present invention. FIG. 7 illustrates a TDFL format included in one TDMA area and a defect list format in the TDFL. As shown in FIG. 7, the TDFL included in one TDMA area includes a defect list header, a plurality of defect lists, and a defect list terminator terminating the defect list. The defect list header includes information on the defect list and configuration of the defect list. The plurality of defect lists includes a list of clusters determined to be defective while using the disc. The defect list terminator terminates the defect list. Additionally, the defect list header includes a "DFL identifier" field, a "Number of DFL entries" (N_DFL) field, a "Number of FAD/CRD entries" field and a "Number of NRD/CND entries" field. The "DFL identifier" field represents ID information identifying a defect list. The "Number of DFL entries" (N_DFL) field represents the total number of the defect list entries. The "Number of FAD/CRD entries" field represents the number of RAD and CRD types. The "Number of NRD/CND entries" field represents the number of NRD and CND types.

In other words, the total number of the DFL entries is recorded on the "Number of DFL entries" (N_DFL) field. The added number of numbers RAD type entries and CRD type entries is recorded on the "Number of FAD/CRD entries" field. The added number of numbers of NRD type entries and CND type entries is recorded on the "number of FAD/CRD entries" field. (Herein, overwriting is processed in the CRD type.) Also, the defect list includes a plurality of DFL entries including information on an actual defective cluster. The entire size of the TDFL may vary in accordance with the information included in the defect list and may also be extendable. The entire size of the TDFL does not exceed four (4) clusters for a single layer disc, and does not exceed eight (8) clusters for a double layer disc.

Figure 8:
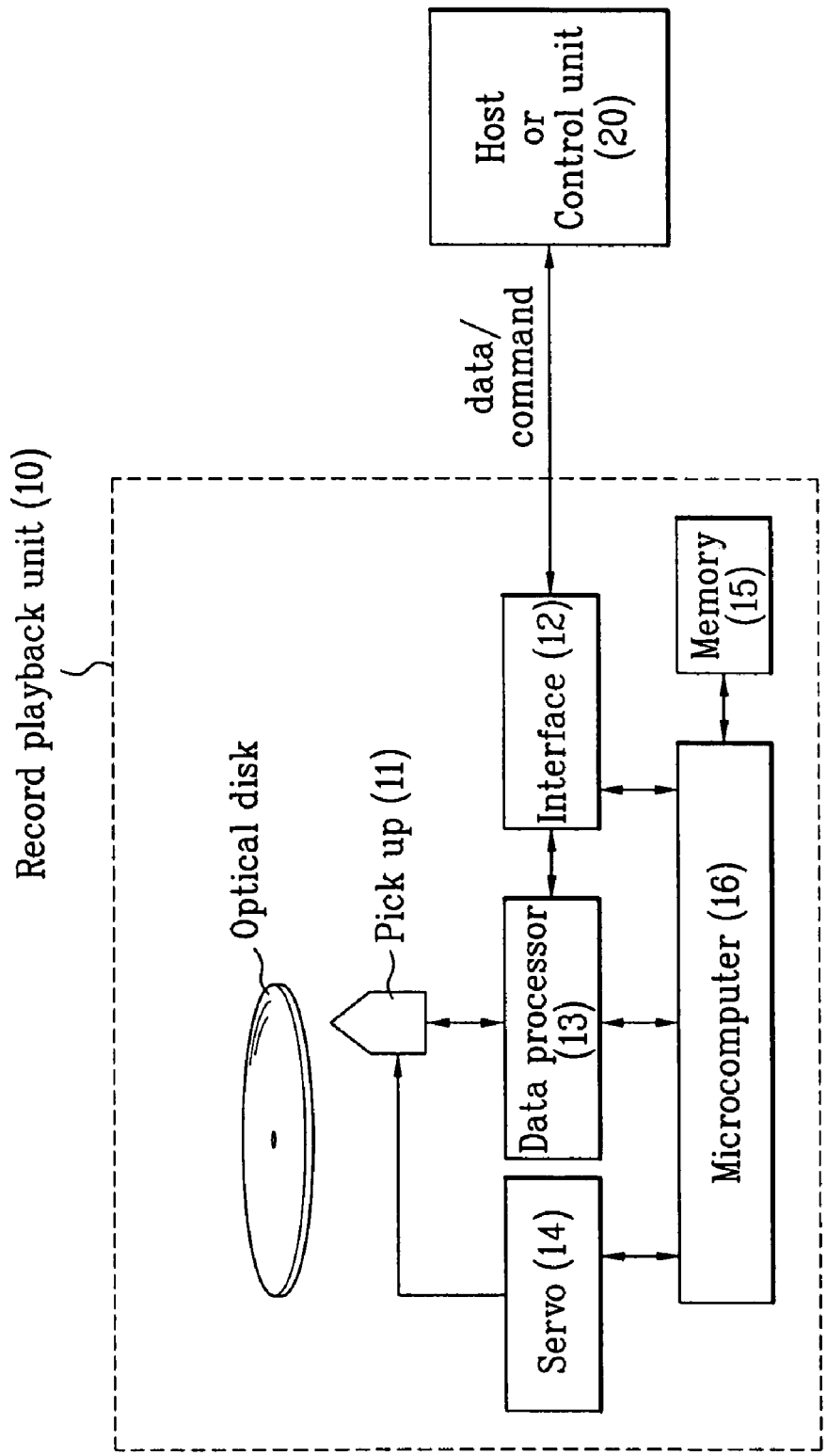
FIG. 8 illustrates a block diagram of an optical recording and/or reproducing apparatus.

FIG. 8 illustrates a block diagram of an optical recording and/or reproducing apparatus. Referring to FIG. 8, the optical recording and/or reproducing apparatus includes a recording/reproducing device 10 and a host or controller 20. The recording/reproducing device 10 records and reproduces the data on the optical disc. The host or controller 20 controls the recording/reproducing device 10 and sends a write command and a reproduction command to the recording/reproducing device 10 for a specific area. The recording/reproducing device 10 records and reproduces data for a specific area according to the command of the controller 20.

Herein, the recording/reproducing device 10 includes an interface unit 12, a pickup unit 11, a data processor 13, a servo unit 14, a memory 15, and a microcomputer 16. The interface unit 12 communicates data and a command with the controller 20. The pickup unit 11 records or reads data on the optical disc. The data processor 13 receives a signal read from the pickup unit 11 and recovers a desired signal value or modulates the signal to be recorded into the signal for being recorded on the optical disc and transmits the modulated signal. The servo unit 14 controls the pickup unit 11 so as to exactly read or record a signal on the optical disc. The memory 15 stores data and various kinds of information including management information temporarily. The microcomputer 16 controls components in the recording/reproducing device 10.

In the recording/reproducing device 10 configured above, the recording process of the write-once optical disc will now be described in detail. When the write-once optical disc is inserted once into the optical recording and/or reproducing apparatus at first, all the management information in the optical disc is read and stored in a memory of the recording/reproducing device 10. The management information is used to record and reproduce the data on the optical disc. In this state, when a user wishes to record data on a specific area of the optical disc, the controller 20 transmits location information and data to be recorded to the recording/reproducing device 10. Herein, the microcomputer 16 of the recording/reproducing device 10 receives the write command. Then, the microcomputer 16 determines whether the area of the optical disc, on which the controller 20 wishes to record data, is a defective area and whether the data is completely recorded from the management information stored in the memory 15. And, finally, the microcomputer 16 records data on an area that is not the defective area and on the previously recorded area according to a write command of the controller 20.

In recording data as described above, when overwriting should be performed at the user's request, the data that is to be recorded on the overwrite area is recorded on another area (i.e., spare area) in the data zone. The related information including the generated CRD entry is temporarily stored in the memory 15 of the recording/reproducing device 10. Then, the stored CRD entry is checked (or searched), and the entries including information on consecutive clusters are reduced into one CRD entry. The information is recorded on DFL entry of the TDFL in the TDMA on the optical disc. Herein, the microcomputer 16 transmits the location information of the replacement area and data to the servo 14 and the data processor 13 and, then, completes recording or replacement recording at a desired location of the disc through the pickup unit 11.

The recording process of the write-once optical disc according to the present invention will further be described in detail. When the write-once optical disc is inserted once into the optical recording and/or reproducing apparatus at first, all the management information in the optical disc is read and stored in the memory 15 of the recording/reproducing device 10. The management information is used to record and reproduce the data on the optical disc. In this state, when a user wishes to reproduce data on a specific area of the optical disc, the controller 20 transmits the location information and the data to be recorded to the recording/reproducing device 10.

Herein, the microcomputer 16 of the recording/reproducing device 10 receives the reproduction command, determines whether the data on the area of the optical disc that the controller 20 wishes to reproduce is recorded on another area in the data zone and the location of a defective area, if the data is not replaced. This can be verified with a DFL entry of the TDFL in the TDMA area described above. Accordingly, if data on the area that the controller 20 wishes to reproduce is not recorded on the spare area, the microcomputer 16 reproduces data on the corresponding area and transmits the reproduced information to the controller 20. If the data on the area that the controller 20 wishes to reproduce is recorded on the spare area (e.g. RAD/CRD type), the microcomputer 16 reproduces data on the corresponding spare area and transmits the reproduced information to the controller 20.

As described above, in the method and apparatus for overwriting data in a write-once optical disc according to the present invention, the write-once optical disc can be more efficient to manage and reproduce by suggesting an efficient method of managing DFL entries, when continuously overwriting data on the previously recorded area of the optical disc.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for overwriting data in a write-once recording medium, the method comprising:

when receiving a plurality of data record commands for a previously recorded area within the recording medium, replacement recording the received data for each record command on a non-recorded area within the recording medium, and when the plurality of record commands is made in a continuous area within the recording medium, the data is recorded on a management area within the recording medium as a management information for the plurality of record commands.

2. The method of claim 1, further comprising:

temporarily storing a management information for each replacement recording of the data according to each record command in a memory.

3. The method of claim 1, wherein the one management information is a consecutive re-allocated defect (CRD) entry.

4. The method of claim 3, wherein the CRD entry is recorded in a temporary disc management area (TDMA) within the recording medium.

5. The method of claim 3, wherein the CRD entry comprises a location information of a start cluster and an end cluster in an overwriting area of continuous data, and a location information of a start cluster and an end cluster in a replacement area.

6. The method of claim 5, wherein the location information is represented as a first physical sector number of the clusters.

7. The method of claim 3, wherein the CRD entry is formed of a pair of two entries.

8. The method of claim 7, wherein, among the two entries, a first physical sector number of a start cluster in an overwriting area is recorded in a "Defective Cluster first PSN" field of a first entry.

9. The method of claim 7, wherein, among the two entries, a first physical sector number of an end cluster in an overwriting area is recorded in a "Defective Cluster first PSN" field of a first entry.

10. The method of claim 7, wherein, among the two entries, a first physical sector number of a start cluster in a replacement area is recorded in a "Replacement Cluster first PSN" field of a second entry.

11. The method of claim 7, wherein, among the two entries, a first physical sector number of an end cluster in a replacement area is recorded in a "Replacement Cluster first PSN" field of a second entry.

12. The method of claim 7, wherein the entry comprises a "status" field as information for differentiating a type and property of each entry.

13. The method of claim 1, wherein the management information comprises a location information of the overwriting area and the replacement area.

14. A method for overwriting data in a write-once recording medium, the method comprising:

when receiving a data record command for a previously recorded area within the recording medium, replacement recording the received data for the record command on a non-recorded area within the recording medium; and recording a location information of the previously recorded area and a replacement area as at least one entry in a management area, and recording data while excluding an entry of a defect area existing within the previously recorded area.

15. The method of claim 14, wherein, when the data requested by the record command is formed of a plurality of continuous clusters, the at least one entry recording the location information of the previously recorded area and the replacement area is formed of two pair entries.

16. An apparatus for overwriting data in a write-once recording medium, the apparatus comprising:

a memory for temporarily storing a management information in accordance with a replacement recording; and a microcomputer replacement recording the received data for each record command on a non-recorded area within the recording medium, when receiving a plurality of data record commands for a previously recorded area within the recording medium, temporarily the storing management information in accordance with the replacement recording for each record command, and controlling the management information as one entry so as to be recorded on a management area within the recording medium, when a continuity exists between the management information in accordance with the record command for each record command stored in the memory.

17. An apparatus for overwriting data in a write-once recording medium, the apparatus comprising:

a pickup unit recording data and management information on the recording medium; and a microcomputer replacement recording the received data for the record command on a non-recorded area within the recording medium, when receiving a data record command for a previously recorded area within the recording medium, recording a location information of the previously recorded area and a replacement area as at least one entry in a management area, and controlling the pickup unit so that data is recorded while excluding an entry of a defect area existing within the previously recorded area.

18. A recording medium, comprising:

a data area including a replacement area replacing a previously recorded area in accordance with a record command for the previously recorded area within the recording medium; and a temporary disc management area recording location information of the previously recorded area and the replacement area as two pair entries, wherein, when recording the two pair entries in the previously recorded area, the data is recorded while excluding an entry of a defect area existing within the previously recorded area.

* * * * *